United States Patent
Kawasaki et al.

(10) Patent No.: US 11,772,208 B2
(45) Date of Patent: Oct. 3, 2023

(54) RESIN COMPOSITION AND SOLDERING FLUX

(71) Applicant: Senju Metal Industry Co., Ltd., Tokyo (JP)

(72) Inventors: Hiroyoshi Kawasaki, Tokyo (JP); Masato Shiratori, Tochigi (JP); Hiroyuki Yamasaki, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 82 days.

(21) Appl. No.: 16/957,827

(22) PCT Filed: Dec. 28, 2018

(86) PCT No.: PCT/JP2018/048520
§ 371 (c)(1),
(2) Date: Jun. 25, 2020

(87) PCT Pub. No.: WO2019/132015
PCT Pub. Date: Jul. 4, 2019

(65) Prior Publication Data
US 2021/0060714 A1 Mar. 4, 2021

(30) Foreign Application Priority Data
Dec. 29, 2017 (JP) ................. 2017-255177

(51) Int. Cl.
*B23K 35/362* (2006.01)
*C08L 93/04* (2006.01)
*C08K 5/092* (2006.01)
*B23K 35/26* (2006.01)
*C22C 13/00* (2006.01)
*B23K 35/36* (2006.01)

(52) U.S. Cl.
CPC .......... *B23K 35/362* (2013.01); *B23K 35/262* (2013.01); *B23K 35/3613* (2013.01); *C08K 5/092* (2013.01); *C08L 93/04* (2013.01); *C22C 13/00* (2013.01)

(58) Field of Classification Search
CPC .................................................. B23K 35/362
See application file for complete search history.

(56) References Cited

U.S. PATENT DOCUMENTS

| 4,561,913 A * | 12/1985 | Zado ................. B23K 35/3612 |
| | | 148/23 |
| 6,790,597 B2 * | 9/2004 | Dershem ................. B32B 7/04 |
| | | 430/300 |
| 7,861,915 B2 | 1/2011 | Kay et al. |
| 2006/0011267 A1 | 1/2006 | Kay et al. |
| 2008/0135133 A1 | 6/2008 | Hagiwara |
| 2015/0102090 A1 * | 4/2015 | Arai ................. H05K 13/0465 |
| | | 148/23 |
| 2021/0060714 A1 | 3/2021 | Kawasaki et al. |

FOREIGN PATENT DOCUMENTS

| CN | 1972779 A | 5/2007 |
| CN | 100482043 C | 4/2009 |
| CN | 105855749 A | 8/2016 |
| JP | 2002120090 A * | 4/2002 |
| JP | 2002120090 A | 4/2002 |
| JP | 2005144518 A | 6/2005 |
| JP | 2007532321 A | 11/2007 |
| JP | 2008110392 A | 5/2008 |
| JP | 2013163221 A | 8/2013 |
| JP | 2013188761 A | 9/2013 |
| JP | 6540789 B1 | 7/2019 |
| JP | 2019118928 A | 7/2019 |
| WO | 2006025224 A1 | 3/2006 |

* cited by examiner

*Primary Examiner* — Anthony M Liang
(74) *Attorney, Agent, or Firm* — THE WEBB LAW FIRM

(57) ABSTRACT

Provided are a resin composition and a soldering flux. The resin composition includes at least one acid and rosin. The acid is selected from a dimer acid which is a reaction product of oleic acid and linoleic acid, a trimer acid which is a reaction product of oleic acid and linoleic acid, a hydrogenated dimer acid obtained by hydrogenating a dimer acid which is a reaction product of oleic acid and linoleic acid, and a hydrogenated trimer acid obtained by hydrogenating a trimer acid which is a reaction product of oleic acid and linoleic acid. A weight ratio of the at least one acid to the rosin is 0.15 or more and 1.00 or less based on the weight of the rosin. The soldering flux is obtained by diluting the resin composition with a solvent.

2 Claims, No Drawings

RESIN COMPOSITION AND SOLDERING FLUX

CROSS-REFERENCE TO RELATED APPLICATIONS

This application is the United States national phase of International Application No. PCT/JP2018/048520 filed Dec. 28, 2018, and claims priority to Japanese Patent Application No. 2017-255177 filed Dec. 29, 2017, the disclosures of which are hereby incorporated by reference in their entirety.

TECHNICAL FIELD

The present invention relates to a resin composition and a soldering flux using the resin composition.

BACKGROUND

In general, a flux used in soldering has effects of chemically removing metal oxides present on solder and the metal surface of a joint target to be soldered and allowing movement of metal elements at the boundary between the two. Therefore, by soldering using the flux, an intermetallic compound can be formed between the solder and the metal surface of the joint target, so that strong joint can be obtained.

In a flux containing a resin such as rosin, a residue mainly composed of rosin remains after soldering. However, any cracks easily occur in a residue mainly composed of rosin. If there are cracks in the residue, moisture is easily adsorbed thereto due to the effect of moisture absorption over time. As a result, since reliability degradation such as migration occurs, such a residue in which cracks occur is not desirable. For this reason, a soldering flux has been proposed in which the content rate of abietic-acid-based resin acid contained in rosin is adjusted to ensure the visibility of visual inspection of cracks (see, for example, Patent Document 1).

However, it may be expensive to prepare rosin so as to reduce the content rate of abietic-acid-based resin acid, and it is desirable to suppress cracking in a residue by a simple method.

The present invention has been made to solve such a problem, and has an object to provide a resin composition and a soldering flux, which are capable of suppressing cracking in a residue.

The inventors have been found that a dimer acid which is a reaction product of oleic acid and linoleic acid and its hydrogenated product, as well as a trimer acid which is a reaction product of oleic acid and linoleic acid and its hydrogenated product allow rosin to be imparted flexibility, thereby making it possible to suppress cracking in a residue.

Accordingly, the present invention relates to a resin composition containing any one of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid; or two species or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid; and rosin, wherein a ratio between an amount of any one of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, or a total amount of the two species or more of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, and an amount of rosin is 0.15 or more and 1.00 or less based on that of the rosin.

Also, the present invention relates to a soldering flux containing any one of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and hydrogenated trimer acid obtained by adding hydrogen to a trimer acid which is a reaction product of oleic acid and linoleic acid; or two species or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, rosin, and a solvent, wherein a ratio between an amount of any one of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, or a total amount of the two species or more of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is a reaction product of the oleic acid and the linoleic acid, and the hydrogenated trimer acid obtained by adding the hydrogen to the trimer acid which is the reaction product of the oleic acid and the linoleic acid, and an amount of rosin is 0.15 or more and 1.00 or less based on that of the rosin.

The soldering flux preferably contains a total amount of 1.5 wt % or more and 10.0 wt % or less of any one of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid; or two species or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid.

Also, the soldering flux preferably includes 5.0 wt % or more and 10.0 wt % or less of the rosin, and 80.0 wt % or more and 90.0 wt % or less of the solvent. In addition, it preferably further includes, as an activator, 0 wt % or more and 5.0 wt % or less of a different organic acid, 0 wt % or more and 1.0 wt % or less of an organohalogen compound, and 0 wt % or more and 1.0 wt % or less of an amine hydrohalide. Further, it preferably further includes, as an activator, 0 wt % or more and 1.0 wt % or less of an amine.

In the resin composition of the present invention, the ratio between the amount of any one of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, or the total amount of two species or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, and the amount of the rosin is 0.15 or more and 1.00 or less based on that of the rosin.

The soldering flux of the present invention is obtained by diluting the resin composition of the present invention with a solvent, and the ratio between the amount of any one of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, or the total amount of two species or more of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, and the amount of rosin is 0.15 or more and 1.00 or less based on that of the rosin. Thus, it is possible to suppress any cracks in a residue after soldering.

DETAILED DESCRIPTION

<Example of Resin Composition and Soldering Flux of Present Embodiment>

The resin composition of the present embodiment contains any one of any one of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid; or two species or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, and rosin.

In the resin composition, a ratio between an amount of any one of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, or a total amount of the two species or more of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, and an amount of rosin is 0.15 or more and 1.00 or less based on that of the rosin.

The soldering flux of the present embodiment is obtained by diluting this resin composition with a solvent, and contains any one of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, or the two species or more of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, rosin, and a solvent.

In the soldering flux, a ratio between an amount of any one of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, or a total amount of the two species or more of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, and an amount of rosin is 0.15 or more and 1.00 or less based on that of the rosin.

The dimer acid of the present embodiment is the reaction product of the oleic acid and the linoleic acid, and is a dimer having 36 carbon atoms. In addition, the trimer acid of the present embodiment is the reaction product of the oleic acid and the linoleic acid, and is a trimer having 54 carbon atoms. The dimer acid and trimer acid of the present embodiment, which are the reaction products of the oleic acid and the linoleic acid, have heat resistance within a temperature range assumed for soldering, and function as activators during soldering. In addition, they impart flexibility to rosin in a residue to suppress any cracks in the rosin.

When the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, or the hydrogenated trimer acid obtained by adding the hydrogen to the trimer acid which is the reaction product of the oleic acid and the linoleic acid function as any activators, the amount thereof is decreased. For this reason, when an added amount of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, or the hydrogenated trimer acid obtained by adding the hydrogen to the trimer acid which is the reaction product of the oleic acid and the linoleic acid is small, an amount of the dimer acid which is a reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, or the hydrogenated trimer acid obtained by adding the hydrogen to the trimer acid which is the reaction product of the oleic acid and the linoleic acid remained in a residue is decreased. As a result, the ratio of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, or the hydrogenated trimer acid obtained by adding the hydrogen to the trimer acid which is the reaction product of the oleic acid and the linoleic acid to the rosin becomes lowered, so that the effect of suppressing cracks in the rosin within the residue cannot be obtained.

So, the soldering flux contains a total amount of 1.5 wt % or more and 10.0 wt % or less of any one of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, or two species or more of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid.

The soldering flux of the present embodiment contains 5.0 wt % or more and 10.0 wt % or less of the rosin, and 80.0 wt % or more and 90.0 wt % or less of the solvent. In addition, the soldering flux of the present embodiment further contains, as an activator, 0 wt % or more and 5.0 wt % or less of a different organic acid, 0 wt % or more and 1.0 wt % or less of an organohalogen compound, and 0 wt % or more and 1.0 wt % or less of an amine hydrohalide. Further, the soldering flux of the present embodiment further contains, as an activator, 0 wt % or more and 1.0 wt % or less of an amine.

As the rosin, raw material rosins such as gum rosin, wood rosin, and tall oil rosin, and derivatives obtained from the raw material rosins are exemplified. As the derivatives, purified rosins, hydrogenated rosins, disproportionated rosins, polymerized rosins, acid modified rosins, phenol modified rosins, and α,β unsaturated carboxylic acid modified products (acrylic acid modified rosins, maleic acid modified rosins, fumaric acid modified rosins, and the like); purified products, hydrides, and disproportionated products of the polymerized rosins; and purified products, hydrides, and disproportionated products of the α,β-unsaturated carboxylic acid modified products are exemplified. One or two species or more of these can be used.

The soldering flux of the present embodiment may further contain a different resin in addition to the rosins. As the different resin, at least one resin selected from a terpene resin, a modified terpene resin, a terpene phenol resin, a modified terpene phenol resin, a styrene resin, a modified styrene resin, a xylene resin and a modified xylene resin may be contained. As the modified terpene resin, an aromatic modified terpene resin, a hydrogenated terpene resin, a hydrogenated aromatic modified terpene resin or the like can be used. As the modified terpene phenol resin, a hydrogenated terpene phenol resin or the like can be used. As the modified styrene resin, a styrene acrylic resin, a styrene maleic acid resin or the like can be used. As the modified xylene resin, a phenol-modified xylene resin, an alkylphenol-modified xylene resin, a resol type phenol-modified xylene resin, a polyol-modified xylene resin or a polyoxyethylene-added xylene resin can be used. When the total amount of rosin is estimated at 100, an amount of the different resin is preferably 40 wt % or less, more preferably 20 wt % or less.

As the different organic acid, a glutaric acid, an adipic acid, an azelaic acid, an eicosane diacid, a citric acid, a glycolic acid, a succinic acid, a salicylic acid, a diglycolic acid, a dipicolinic acid, a dibutyl aniline diglycolic acid, a suberic acid, a sebacic acid, a thioglycol acid, a phthalic acid, an isophthalic acid, a terephthalic acid, a dodecanedioic acid, a parahydroxyphenylacetic acid, a picolinic acid, a phenylsuccinic acid, a fumaric acid, a maleic acid, a malonic acid, a lauric acid, a benzoic acid, a tartaric acid, a tris(2-carboxyethyl)isocyanurate, a glycine, a 1,3-cyclohexanedicarboxylic acid, a 2,2-bis(hydroxymethyl)propionic acid, a 2,2-bis(hydroxymethyl)butanoic acid, a 4-tert-butylbenzoic acid, a 2,3-dihydroxybenzoic acid, a 2,4-diethyl glutaric acid, a 2-quinolinecarboxylic acid, a 3-hydroxybenzoic acid, a malic acid, a p-anisic acid, a palmitic acid, a stearic acid, a 12-hydroxystearic acid, an oleic acid, a linoleic acid, and a linolenic acid are exemplified.

Further, for the different organic acid, as a dimer acid other than the reaction product of the oleic acid and the linoleic acid, a trimer acid other than the reaction product of the oleic acid and the linoleic acid, a hydrogenated dimer acid obtained by adding hydrogen to the dimer acid other than the reaction product of the oleic acid and the linoleic acid or a hydrogenated trimer acid obtained by adding hydrogen to a trimer acid other than the reaction product of the oleic acid and the linoleic acid, a dimer acid which is a reaction product of an acrylic acid, a trimer acid which is a reaction product of an acrylic acid, a dimer acid which is a reaction product of a methacrylic acid, a trimer acid which is a reaction product of a methacrylic acid, a dimer acid which is a reaction product of an acrylic acid and a methacrylic acid, a trimer acid which is a reaction product of an acrylic acid and a methacrylic acid, a dimer acid which is a reaction product of oleic acid, a trimer acid which is a reaction product of oleic acid, a dimer acid which is a reaction product of linoleic acid, a trimer acid which is a reaction product of linoleic acid, a dimer acid which is a reaction product of a linolenic acid, a trimer acid which is a reaction product of a linolenic acid, a dimer acid which is a reaction product of an acrylic acid and oleic acid, a trimer acid which is a reaction product of an acrylic acid and oleic acid, a dimer acid which is a reaction product of an acrylic acid and linoleic acid, a trimer acid which is a reaction product of an acrylic acid and linoleic acid, a dimer acid which is a reaction product of an acrylic acid and a linolenic acid, a trimer acid which is a reaction product of an acrylic acid and a linolenic acid, a dimer acid which is a reaction product of a methacrylic acid and oleic acid, a trimer acid which is a reaction product of a methacrylic acid and oleic acid, a dimer acid which is a reaction product of a methacrylic acid and linoleic acid, a trimer acid which is a reaction product of a methacrylic acid and linoleic acid, a dimer acid which is a reaction product of a methacrylic acid and a linolenic acid, a trimer acid which is a reaction product of a methacrylic acid and a linolenic acid, a dimer acid which is a reaction product of oleic acid and a linolenic acid, a trimer acid which is a reaction product of oleic acid and a linolenic acid, a dimer acid which is a reaction product of linoleic acid and a linolenic acid, a trimer acid which is a reaction product of linoleic acid and a linolenic acid, a hydrogenated dimer acid obtained by adding hydrogen to a dimer acid other than the reaction product of the oleic acid and the linoleic acid indicated above, and a hydrogenated trimer acid obtained by adding hydrogen to a trimer acid other than the reaction product of the oleic acid and the linoleic acid indicated above are exemplified.

As the amine, monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylene bisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methyl benzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino) methyl]benzotriazole, 2,6-bis[(1H-benzotriazol-1-yl)methyl]-4-methylphenol, 5-methyl benzotriazole, 5-phenyltetrazole and the like are exemplified.

As the organohalogen compound, organic bromo compounds such as trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, tetrabromophthalic acid and bromosuccinic acid are exemplified. Moreover, organic chloro compounds such as chloroalkane, chlorinated fatty acid ester, het acid and het anhydride are exemplified.

The amine hydrohalide is a compound obtained by causing an amine and hydrogen halide to react, and the examples thereof include aniline hydrochloride and aniline hydrobromide. As the amine of the amine hydrohalide, the above-described amines can be used, and ethylamine, ethylenediamine, triethylamine, methylimidazole and 2-ethyl-4-methylimidazole and the like are exemplified. As the hydrogen halide, hydrides of chlorine, bromine, iodine and fluorine (hydrogen chloride, hydrogen bromide, hydrogen iodide and hydrogen fluoride) are exemplified. Moreover, any boron fluorides may be contained in place of, or in combination with, the amine hydrohalide, and as the boron fluorides, fluoroboric acid and the like are exemplified.

As the solvent, water, alcohol solvent, glycol ether solvent, terpineols and the like are exemplified. As the alcohol solvent, ethanol, industrial ethanol (mixed solvent obtained by adding methanol and/or isopropyl alcohol to ethanol), isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanol, 1,4-cyclohexanediol, 1,4-cyclohexanedimethanol, erythritol, threitol, guaiacol glycerol ether, 3,6-dimethyl-4-octin-3,6-diol, 2,4,7,9-tetramethyl-5-decyne-4,7-diol and the like are exemplified. As the glycol ether solvent, hexyl diglycol, diethylene glycol mono-2-ethyl hexyl ether, ethylene glycol monophenyl ether, 2-methylpentane-2,4-diol, diethylene glycol monohexyl ether, diethylene glycol dibutyl ether, triethylene glycol monobutyl ether and the like are exemplified. The solvent is preferably the alcohol solvent such as the ethanol, the industrial ethanol (the mixed solvent obtained by adding methanol and/or isopropyl alcohol to ethanol) or the isopropyl alcohol.

<Examples of Action/Effect of the Resin Composition and Soldering Flux of Present Embodiment>

A soldering flux obtained by diluting, with a solvent, a resin composition containing any one of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, or two species or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, wherein the ratio of the acid(s) to rosin falls within a predetermined range, makes it possible to suppress any cracks in a residue after soldering. Moreover, the occurrence of precipitation can be suppressed.

EXECUTED EXAMPLES

Resin compositions of the Executed Examples and the Comparative Examples were prepared with the compositions shown in Tables 1, 2, and 3 below. The resin compositions of the Executed Examples shown in Table 1 were diluted with a solvent to prepare soldering fluxes of the Executed Examples with the compositions shown in Table 4. The resin compositions of the Executed Examples shown in Table 2 were diluted with the solvent to prepare soldering fluxes of the Executed Examples with the compositions shown in Table 5. The resin compositions of the Comparative Examples shown in Table 3 were diluted with the solvent to prepare soldering fluxes of the Comparative Examples with the compositions shown in Table 6. Then, the soldering fluxes of the Executed Examples and the Comparative Examples were used to verify the presence or absence of crack(s) in a residue. The composition rates in Tables 1, 2, and 3 have been expressed in wt (weight) % when the total amount of the resin composition is 100, and the composition rates in Tables 4, 5, and 6 have been expressed in wt (weight) % when the total amount of the flux is 100.

<Evaluation of Cracking in Residue After Soldering>

(1) Verification Method

The soldering fluxes described in the Executed Examples and the Comparative Examples have been respectively applied to Cu plates. The size of the Cu plate has been 30×30×0.3 mm. The amount of the soldering flux has been 0.05 ml. A solder sample has been placed on the soldering flux applied to the Cu plate to make a test piece. The solder sample has a composition expressed as Sn-3Ag-0.5Cu, which contains 3.0 wt % of Ag and 0.5 wt % of Cu, and the remainder of Sn. 0.3 g of a solder ring obtained by forming this solder into an annular shape has been used. The test piece has been placed on a hot plate, heated to 250° C., held for 20 seconds after melting the solder, and then, cooled to room temperature. The presence or absence of crack(s) in the residue was confirmed with a stereomicroscope at a magnification of 40 times.

(2) Criterion for Determination

∘: No cracks confirmed.

×: Crack(s) confirmed.

TABLE 1

| | Material | | Executed Example 1a | Executed Example 2a | Executed Example 3a | Executed Example 4a | Executed Example 5a |
|---|---|---|---|---|---|---|---|
| Organic acid | Dimer which is a reaction product of oleic acid and linoleic acid | Dimer acid | 33.3 | | | | 16.7 |
| | | Hydrogenated dimer acid | | 33.3 | | | |
| | Trimer which is a reaction product of oleic acid and linoleic acid | Trimer acid | | | 33.3 | | 16.7 |
| | | Hydrogenated trimer acid | | | | 33.3 | |
| | A different organic acid | Malonic acid | | | | | |
| | | Succinic acid | | | | | |
| | | Glutaric acid | | | | | |
| | | Adipic acid | | | | | |
| | Resin | Acrylic acid modified resin | 66.7 | 66.7 | 66.7 | 66.7 | 66.7 |
| | Ratio of dimer acid, trimer acid to resin | | 0.5 | 0.5 | 0.5 | 0.5 | 0.5 |
| | Amine | 2-Phenylimidazole | | | | | |
| | | Monoethanolamine | | | | | |
| Halogen | Amine hydrohalide | Diphenylguanidine•HB | | | | | |
| | Organohalogen compound | Trans-2,3-dibromo-2-butene-1,4-diol | | | | | |

| | Material | | Executed Example 6a | Executed Example 7a | Executed Example 8a | Executed Example 9a | Executed Example 10a |
|---|---|---|---|---|---|---|---|
| Organic acid | Dimer which is a reaction product of oleic acid and linoleic acid | Dimer acid | | 50.0 | 13.0 | 9.1 | 16.7 |
| | | Hydrogenated dimer acid | 16.7 | | | | |
| | Trimer which is a reaction product of oleic acid and linoleic acid | Trimer acid | | | | | |
| | | Hydrogenated trimer acid | 16.7 | | | | |
| | A different organic acid | Malonic acid | | | | | |
| | | Succinic acid | | | | | |
| | | Glutaric acid | | | | | |
| | | Adipic acid | | | | 30.3 | |

TABLE 1-continued

|  |  |  |  |  |  |  |  |
|---|---|---|---|---|---|---|---|
|  | Resin | Acrylic acid modified resin | 66.7 | 50.0 | 87.0 | 60.0 | 83.3 |
|  | Ratio of dimer acid, trimer acid to resin |  | 0.5 | 1.0 | 0.15 | 0.15 | 0.2 |
|  | Amine | 2-Phenylimidazole |  |  |  |  |  |
|  |  | Monoethanolamine |  |  |  |  |  |
| Halogen | Amine hydrohalide | Diphenylguanidine•HB |  |  |  |  |  |
|  | Organohalogen compound | Trans-2,3-dibromo-2-butene-1,4-diol |  |  |  |  |  |

TABLE 2

| | Material | | Executed Example 11a | Executed Example 12a | Executed Example 13a | Executed Example 14a | Executed Example 15a |
|---|---|---|---|---|---|---|---|
| Organic acid | Dimer which is a reaction product of oleic acid and linoleic acid | Dimer acid | 23.1 | 41.2 | 50.0 | 14.7 | 29.4 |
| | | Hydrogenated dimer acid | | | | | |
| | Trimer which is a reaction product of oleic acid and linoleic acid | Trimer acid | | | | | |
| | | Hydrogenated trimer acid | | | | 14.7 | |
| | A different organic acid | Malonic acid | | | | 2.9 | |
| | | Succinic acid | | | | 2.9 | |
| | | Glutaric acid | | | | 2.9 | 5.9 |
| | | Adipic acid | | | | 2.9 | |
| | Resin | Acrylic acid modified resin | 76.9 | 58.8 | 50.0 | 58.8 | 58.8 |
| | Ratio of dimer acid, trimer acid to resin | | 0.3 | 0.7 | 1.0 | 0.5 | 0.5 |
| | Amine | 2-Phenylimidazole | | | | | 5.9 |
| | | Monoethanolamine | | | | | |
| Halogen | Amine hydrohalide | Diphenylguanidine•HB | | | | | |
| | Organohalogen compound | Trans-2,3-dibromo-2-butene-1,4-diol | | | | | |

| | Material | | Executed Example 16a | Executed Example 17a | Executed Example 18a | Executed Example 19a | Executed Example 20a |
|---|---|---|---|---|---|---|---|
| Organic acid | Dimer which is a reaction product of oleic acid and linoleic acid | Dimer acid | 29.4 | 29.4 | 29.4 | 29.1 | 27.8 |
| | | Hydrogenated dimer acid | | | | | |
| | Trimer which is a reaction product of oleic acid and linoleic acid | Trimer acid | | | | | |
| | | Hydrogenated trimer acid | | | | | |
| | A different organic acid | Malonic acid | | | | | |
| | | Succinic acid | | | | | |
| | | Glutaric acid | 5.9 | 5.9 | 5.9 | 5.8 | 5.6 |
| | | Adipic acid | | | | | |
| | Resin | Acrylic acid modified resin | 58.8 | 58.8 | 58.8 | 58.1 | 55.6 |
| | Ratio of dimer acid, trimer acid to resin | | 0.5 | 0.5 | 0.5 | 0.5 | 0.5 |
| | Amine | 2-Phenylimidazole | | | | 5.8 | 5.6 |
| | | Monoethanolamine | 5.9 | | | | |
| Halogen | Amine hydrohalide | Diphenylguanidine•HB | | 5.9 | | 1.2 | |
| | Organohalogen compound | Trans-2,3-dibromo-2-butene-1,4-diol | | | 5.9 | | 5.6 |

TABLE 3

| | Material | | Comparative Example 1a | Comparative Example 2a | Comparative Example 3a | Comparative Example 4a | Comparative Example 5a | Comparative Example 6a | Comparative Example 7a |
|---|---|---|---|---|---|---|---|---|---|
| Organic acid | Dimer which is a reaction product of oleic acid and linoleic acid | Dimer acid | | | | | 0.0 | 1.0 | 4.8 |
| | | Hydrogenated dimer acid | | | | | | | |
| | Trimer which is a reaction product of oleic acid and linoleic acid | Trimer acid | | | | | | | |
| | | Hydrogenated trimer acid | | | | | | | |
| | A different organic acid | Malonic acid | 33.3 | | | | | | |
| | | Succinic acid | | 33.3 | | | | | |
| | | Glutaric acid | | | 33.3 | | | | |
| | | Adipic acid | | | | 33.3 | | | |
| | Resin | Acrylic acid modified resin | 66.7 | 66.7 | 66.7 | 66.7 | 100.0 | 99.0 | 95.2 |

TABLE 3-continued

| | | | | | | | | |
|---|---|---|---|---|---|---|---|---|
| | Ratio of dimer acid, trimer acid to resin | | 0.0 | 0.0 | 0.0 | 0.0 | 0.0 | 0.01 | 0.05 |
| | Amine | 2-Phenylimidazole | | | | | | | |
| | | Monoethanolamine | | | | | | | |
| Halogen | Amine hydrohalide | Diphenylguanidine•HB | | | | | | | |
| | Organohalogen compound | Trans-2,3-dibromo-2-butene-1,4-diol | | | | | | | |

| | Material | | Comparative Example 8a | Comparative Example 9a | Comparative Example 10a | Comparative Example 11a | Comparative Example 12a | Comparative Example 13a |
|---|---|---|---|---|---|---|---|---|
| Organic acid | Dimer which is a reaction product of oleic acid and linoleic acid | Dimer acid | 9.1 | | | | | |
| | | Hydrogenated dimer acid | | | | | | |
| | Trimer which is a reaction product of oleic acid and linoleic acid | Trimer acid | | | | | | |
| | | Hydrogenated trimer acid | | | | | | |
| | A different organic acid | Malonic acid | | | | | | |
| | | Succinic acid | | | | | | |
| | | Glutaric acid | | 1.0 | 4.8 | 9.1 | 23.1 | 50.0 |
| | | Adipic acid | | | | | | |
| | Resin | Acrylic acid modified resin | 90.9 | 99.0 | 95.2 | 90.9 | 76.9 | 50.0 |
| | Ratio of dimer acid, trimer acid to resin | | 0.1 | 0.0 | 0.0 | 0.0 | 0.0 | 0.0 |
| | Amine | 2-Phenylimidazole | | | | | | |
| | | Monoethanolamine | | | | | | |
| Halogen | Amine hydrohalide | Diphenylguanidine•HB | | | | | | |
| | Organohalogen compound | Trans-2,3-dibromo-2-butene-1,4-diol | | | | | | |

TABLE 4

| | Material | | Executed Example 1b | Executed Example 2b | Executed Example 3b | Executed Example 4b | Executed Example 5b |
|---|---|---|---|---|---|---|---|
| Organic acid | Dimer which is a reaction product of oleic acid and linoleic acid | Dimer acid | 5.0 | | | | 2.5 |
| | | Hydrogenated dimer acid | | 5.0 | | | |
| | Trimer which is a reaction product of oleic acid and linoleic acid | Trimer acid | | | 5.0 | | 2.5 |
| | | Hydrogenated trimer acid | | | | 5.0 | |
| | A different organic acid | Malonic acid | | | | | |
| | | Succinic acid | | | | | |
| | | Glutaric acid | | | | | |
| | | Adipic acid | | | | | |
| | Resin | Acrylic acid modified resin | 10.0 | 10.0 | 10.0 | 10.0 | 10.0 |
| | Ratio of dimer acid, trimer acid to resin | | 0.5 | 0.5 | 0.5 | 0.5 | 0.5 |
| | Amine | 2-Phenylimidazole | | | | | |
| | | Monoethanolamine | | | | | |
| Halogen | Amine hydrohalide | Diphenylguanidine•HB | | | | | |
| | Organohalogen compound | Trans-2,3-dibromo-2-butene-1,4-diol | | | | | |
| | Solvent | Isopropyl alcohol | 85.0 | 85.0 | 85.0 | 85.0 | 85.0 |
| | Presence or absence of cracks after soldering | | ○ | ○ | ○ | ○ | ○ |
| | Comprehensive evaluation | | ○ | ○ | ○ | ○ | ○ |

| | Material | | Executed Example 6b | Executed Example 7b | Executed Example 8b | Executed Example 9b | Executed Example 10b |
|---|---|---|---|---|---|---|---|
| Organic acid | Dimer which is a reaction product of oleic acid and linoleic acid | Dimer acid | | 5.0 | 1.5 | 1.5 | 2.0 |
| | | Hydrogenated dimer acid | 2.5 | | | | |
| | Trimer which is a reaction product of oleic acid and linoleic acid | Trimer acid | | | | | |
| | | Hydrogenated trimer acid | 2.5 | | | | |
| | A different organic acid | Malonic acid | | | | | |
| | | Succinic acid | | | | | |
| | | Glutaric acid | | | | | |
| | | Adipic acid | | | | 5.0 | |
| | Resin | Acrylic acid modified resin | 10.0 | 5.0 | 10.0 | 10.0 | 10.0 |
| | Ratio of dimer acid, trimer acid to resin | | 0.5 | 1.0 | 0.15 | 0.15 | 0.2 |
| | Amine | 2-Phenylimidazole | | | | | |
| | | Monoethanolamine | | | | | |

TABLE 4-continued

| | | | | | | | |
|---|---|---|---|---|---|---|---|
| Halogen | Amine hydrohalide | Diphenylguanidine•HB | | | | | |
| | Organohalogen compound | Trans-2,3-dibromo-2-butene-1,4-diol | | | | | |
| | Solvent | Isopropyl alcohol | 85.0 | 90.0 | 88.5 | 83.5 | 88.0 |
| | Presence or absence of cracks after soldering | | ○ | ○ | ○ | ○ | ○ |
| | Comprehensive evaluation | | ○ | ○ | ○ | ○ | ○ |

TABLE 5

| | Material | | Executed Example 11b | Executed Example 12b | Executed Example 13b | Executed Example 14b | Executed Example 15b |
|---|---|---|---|---|---|---|---|
| Organic acid | Dimer which is a reaction product of oleic acid and linoleic acid | Dimer acid | 3.0 | 7.0 | 10.0 | 2.5 | 5.0 |
| | | Hydrogenated dimer acid | | | | | |
| | Trimer which is a reaction product of oleic acid and linoleic acid | Trimer acid | | | | | |
| | | Hydrogenated trimer acid | | | | 2.5 | |
| | A different organic acid | Malonic acid | | | | 0.5 | |
| | | Succinic acid | | | | 0.5 | |
| | | Glutaric acid | | | | 0.5 | 1.0 |
| | | Adipic acid | | | | 0.5 | |
| | Resin | Acrylic acid modified resin | 10.0 | 10.0 | 10.0 | 10.0 | 10.0 |
| | Ratio of dimer acid, trimer acid to resin | | 0.3 | 0.7 | 1.0 | 0.5 | 0.5 |
| | Amine | 2-Phenylimidazole | | | | | 1.0 |
| | | Monoethanolamine | | | | | |
| Halogen | Amine hydrohalide | Diphenylguanidine•HB | | | | | |
| | Organohalogen compound | Trans-2,3-dibromo-2-butene-1,4-diol | | | | | |
| | Solvent | Isopropyl alcohol | 87.0 | 83.0 | 80.0 | 83.0 | 83.0 |
| | Presence or absence of cracks after soldering | | ○ | ○ | ○ | ○ | ○ |
| | Comprehensive evaluation | | ○ | ○ | ○ | ○ | ○ |

| | Material | | Executed Example 16b | Executed Example 17b | Executed Example 18b | Executed Example 19b | Executed Example 20b |
|---|---|---|---|---|---|---|---|
| Organic acid | Dimer which is a reaction product of oleic acid and linoleic acid | Dimer acid | 5.0 | 5.0 | 5.0 | 5.0 | 5.0 |
| | | Hydrogenated dimer acid | | | | | |
| | Trimer which is a reaction product of oleic acid and linoleic acid | Trimer acid | | | | | |
| | | Hydrogenated trimer acid | | | | | |
| | A different organic acid | Malonic acid | | | | | |
| | | Succinic acid | | | | | |
| | | Glutaric acid | 1.0 | 1.0 | 1.0 | 1.0 | 1.0 |
| | | Adipic acid | | | | | |
| | Resin | Acrylic acid modified resin | 10.0 | 10.0 | 10.0 | 10.0 | 10.0 |
| | Ratio of dimer acid, trimer acid to resin | | 0.5 | 0.5 | 0.5 | 0.5 | 0.5 |
| | Amine | 2-Phenylimidazole | | | | | |
| | | Monoethanolamine | 1.0 | | | | |
| Halogen | Amine hydrohalide | Diphenylguanidine•HB | | 1.0 | | 0.2 | |
| | Organohalogen compound | Trans-2,3-dibromo-2-butene-1,4-diol | | | 1.0 | | 1.0 |
| | Solvent | Isopropyl alcohol | 83.0 | 83.0 | 83.0 | 82.8 | 82.0 |
| | Presence or absence of cracks after soldering | | ○ | ○ | ○ | ○ | ○ |
| | Comprehensive evaluation | | ○ | ○ | ○ | ○ | ○ |

TABLE 6

| | Material | | Comparative Example 1b | Comparative Example 2b | Comparative Example 3b | Comparative Example 4b | Comparative Example 5b | Comparative Example 6b | Comparative Example 7b |
|---|---|---|---|---|---|---|---|---|---|
| Organic acid | Dimer which is a reaction product of oleic acid and linoleic acid | Dimer acid | | | | | 0.0 | 0.1 | 0.5 |
| | | Hydrogenated dimer acid | | | | | | | |
| | Trimer which is a reaction product of oleic acid and linoleic acid | Trimer acid | | | | | | | |
| | | Hydrogenated trimer acid | | | | | | | |

TABLE 6-continued

| | Material | | | | | | | |
|---|---|---|---|---|---|---|---|---|
| | A different organic acid | Malonic acid | 5.0 | | | | | |
| | | Succinic acid | | 5.0 | | | | |
| | | Glutaric acid | | | 5.0 | | | |
| | | Adipic acid | | | | 5.0 | | |
| | Resin | Acrylic acid modified resin | 10.0 | 10.0 | 10.0 | 10.0 | 10.0 | 10.0 | 10.0 |
| | Ratio of dimer acid, trimer acid to resin | | 0.0 | 0.0 | 0.0 | 0.0 | 0.0 | 0.01 | 0.05 |
| | Amine | 2-Phenylimidazole | | | | | | | |
| | | Monoethanolamine | | | | | | | |
| Halogen | Amine hydrohalide | Diphenylguanidine•HB | | | | | | | |
| | Organohalogen compound | Trans-2,3-dibromo-2-butene-1,4-diol | | | | | | | |
| | Solvent | Isopropyl alcohol | 85.0 | 85.0 | 85.0 | 85.0 | 90.0 | 89.9 | 89.5 |
| | Presence or absence of cracks after soldering | | x | x | x | x | x | x | x |
| | Comprehensive evaluation | | x | x | x | x | x | x | x |

| | Material | | Comparative Example 8b | Comparative Example 9b | Comparative Example 10b | Comparative Example 11b | Comparative Example 12b | Comparative Example 13b |
|---|---|---|---|---|---|---|---|---|
| Organic acid | Dimer which is a reaction product of oleic acid and linoleic acid | Dimer acid | 1.0 | | | | | |
| | | Hydrogenated dimer acid | | | | | | |
| | Trimer which is a reaction product of oleic acid and linoleic acid | Trimer acid | | | | | | |
| | | Hydrogenated trimer acid | | | | | | |
| | A different organic acid | Malonic acid | | | | | | |
| | | Succinic acid | | | | | | |
| | | Glutaric acid | | 0.1 | 0.5 | 1.0 | 3.0 | 10.0 |
| | | Adipic acid | | | | | | |
| | Resin | Acrylic acid modified resin | 10.0 | 10.0 | 10.0 | 10.0 | 10.0 | 10.0 |
| | Ratio of dimer acid, trimer acid to resin | | 0.1 | 0.0 | 0.0 | 0.0 | 0.0 | 0.0 |
| | Amine | 2-Phenylimidazole | | | | | | |
| | | Monoethanolamine | | | | | | |
| Halogen | Amine hydrohalide | Diphenylguanidine•HB | | | | | | |
| | Organohalogen compound | Trans-2,3-dibromo-2-butene-1,4-diol | | | | | | |
| | Solvent | Isopropyl alcohol | 89.0 | 89.9 | 89.5 | 89.0 | 87.0 | 80.0 |
| | Presence or absence of cracks after soldering | | x | x | x | x | x | x |
| | Comprehensive evaluation | | x | x | x | x | x | x |

The soldering flux obtained by diluting, with a solvent, a resin composition containing 33.3 wt % of a dimer acid, which is a reaction product of oleic acid and linoleic acid, and 67.7 wt % of rosin and having a ratio of the dimer acid to the rosin of 0.5, which falls within the range specified in the present invention, as shown in the Executed Example 1a, has contained 5.0 wt % of a dimer acid, which is a reaction product of oleic acid and linoleic acid, and 10.0 wt % of rosin and has a ratio of the dimer acid to the rosin of 0.5, which falls within the range specified in the present invention, with the remainder being the solvent, as shown in the Executed Example 1b, as shown in the Executed Example 1b. In the soldering flux of the Executed Example 1b, a sufficient effect of suppressing cracks in a residue after soldering was obtained.

The soldering flux obtained by diluting, with the solvent, a resin composition containing 33.3 wt % of a hydrogenated dimer acid obtained by adding hydrogen to a dimer acid which is a reaction product of oleic acid and linoleic acid, and 67.7 wt % of rosin and having a ratio of the hydrogenated dimer acid to the rosin of 0.5, which falls within the range specified in the present invention, as shown in the Executed Example 2a, has contained 5.0 wt % of a hydrogenated dimer acid obtained by adding hydrogen to a dimer acid which is a reaction product of oleic acid and linoleic acid, and 10.0 wt % of rosin and has a ratio of the hydrogenated dimer acid to the rosin of 0.5, which falls within the range specified in the present invention, with the remainder being the solvent, as shown in the Executed Example 2b. In the soldering flux of the Executed Example 2b as well, a sufficient effect of suppressing cracks in a residue after soldering was obtained.

The soldering flux obtained by diluting, with the solvent, a resin composition containing 33.3 wt % of a trimer acid, which is a reaction product of oleic acid and linoleic acid, and 67.7 wt % of rosin and having a ratio of the trimer acid to the rosin of 0.5, which falls within the range specified in the present invention, as shown in the Executed Example 3a, has contained 5.0 wt % of a trimer acid, which is a reaction product of oleic acid and linoleic acid, and 10.0 wt % of rosin and has a ratio of the trimer acid to the rosin of 0.5, which falls within the range specified in the present invention, with the remainder being the solvent, as shown in the Executed Example 3b. In the soldering flux of the Executed Example 3b as well, a sufficient effect of suppressing cracks in a residue after soldering was obtained.

The soldering flux obtained by diluting, with the solvent, a resin composition containing 33.3 wt % of a hydrogenated trimer acid obtained by adding hydrogen to a trimer acid which is a reaction product of oleic acid and linoleic acid, and 67.7 wt % of rosin and having a ratio of the hydrogenated trimer acid to the rosin of 0.5, which falls within the range specified in the present invention, as shown in the Executed Example 4a, has contained 5.0 wt % of a hydrogenated trimer acid obtained by adding hydrogen to a trimer acid which is a reaction product of oleic acid and linoleic acid, and 10.0 wt % of rosin and has a ratio of the hydrogenated trimer acid to the rosin of 0.5, which falls within the range specified in the present invention, with the remainder being the solvent, as shown in the Executed Example 4b. In the soldering flux of the Executed Example 4b as well, a sufficient effect of suppressing cracks in a residue after soldering was obtained.

The soldering flux obtained by diluting, with the solvent, a resin composition containing 16.7 wt % of a dimer acid which is a reaction product of oleic acid and linoleic acid, 16.7 wt % of a trimer acid which is a reaction product of oleic acid and linoleic acid, and 67.7 wt % of rosin and having a ratio of the total amount of the dimer acid and the trimer acid to the rosin of 0.5, which falls within the range specified in the present invention, as shown in the Executed Example 5a, has contained 2.5 wt % of a dimer acid which is a reaction product of oleic acid and linoleic acid, 2.5 wt % of a trimer acid which is a reaction product of oleic acid and linoleic acid, and 10.0 wt % of rosin and has a ratio of the total amount of the dimer acid and the trimer acid to the rosin of 0.5, which falls within the range specified in the present invention, with the remainder being the solvent, as shown in the Executed Example 5b. In the soldering flux of the Executed Example 5b as well, a sufficient effect of suppressing cracks in a residue after soldering was obtained.

The soldering flux obtained by diluting, with the solvent, a resin composition containing 16.7 wt % of a hydrogenated dimer acid obtained by adding hydrogen to a dimer acid which is a reaction product of oleic acid and linoleic acid, 16.7 wt % of a hydrogenated trimer acid obtained by adding hydrogen to a trimer acid which is a reaction product of oleic acid and linoleic acid, and 67.7 wt % of rosin and having a ratio of the total amount of the hydrogenated dimer acid and the hydrogenated trimer acid to the rosin of 0.5, which falls within the range specified in the present invention, as shown in the Executed Example 6a, has contained 2.5 wt % of a hydrogenated dimer acid obtained by adding hydrogen to a dimer acid which is a reaction product of oleic acid and linoleic acid, 2.5 wt % of a hydrogenated trimer acid obtained by adding hydrogen to a trimer acid which is a reaction product of oleic acid and linoleic acid, and 10.0 wt % of rosin and has a ratio of the total amount of the hydrogenated dimer acid and the hydrogenated trimer acid to the rosin of 0.5, which falls within the range specified in the present invention, with the remainder being the solvent, as shown in the Executed Example 6b. In the soldering flux of the Executed Example 6b as well, a sufficient effect of suppressing cracks in a residue after soldering was obtained.

The soldering flux obtained by diluting, with the solvent, a resin composition containing 50.0 wt % of a dimer acid, which is a reaction product of oleic acid and linoleic acid, and 50.0 wt % of rosin and having a ratio of the dimer acid to the rosin of 1.0, which falls within the range specified in the present invention, as shown in the Executed Example 7a, has contained 5.0 wt % of a dimer acid, which is a reaction product of oleic acid and linoleic acid, and 5.0 wt % of rosin and has a ratio of the dimer acid to the rosin of 1.0, which falls within the range specified in the present invention, with the remainder being the solvent, as shown in the Executed Example 7b. In the soldering flux of the executed Example 7b as well, a sufficient effect of suppressing cracks in a residue after soldering was obtained.

The soldering flux obtained by diluting, with the solvent, a resin composition containing 13.0 wt % of a dimer acid, which is a reaction product of oleic acid and linoleic acid, and 87.0 wt % of rosin and having a ratio of the dimer acid to the rosin of 0.15, which falls within the range specified in the present invention, as shown in the Executed Example 8a, has contained 1.5 wt % of a dimer acid, which is a reaction product of oleic acid and linoleic acid, and 10.0 wt % of rosin and has a ratio of the dimer acid to the rosin of 0.15, which falls within the range specified in the present invention, with the remainder being the solvent, as shown in the Executed Example 8b. In the soldering flux of Example 8b as well, a sufficient effect of suppressing cracks in a residue after soldering was obtained.

The soldering flux obtained by diluting, with the solvent, a resin composition containing 9.1 wt % of a dimer acid, which is a reaction product of oleic acid and linoleic acid, and 60.6 wt % of rosin and having a ratio of the dimer acid to the rosin of 0.15, which falls within the range specified in the present invention, and further containing adipic acid as an organic acid, as shown in the Executed Example 9a, has contained 1.5 wt % of a dimer acid, which is a reaction product of oleic acid and linoleic acid, and 10.0 wt % of rosin and has a ratio of the dimer acid to the rosin of 0.15, which falls within the range specified in the present invention, and further contains adipic acid as an organic acid in an amount which falls within the range specified in the present invention, with the remainder being the solvent, as shown in the Executed Example 9b. In the soldering flux of the executed Example 9b as well, a sufficient effect of suppressing cracks in a residue after soldering was obtained.

The soldering flux obtained by diluting, with the solvent, a resin composition containing 16.7 wt % of a dimer acid, which is a reaction product of oleic acid and linoleic acid, and 83.3 wt % of rosin and having a ratio of the dimer acid to the rosin of 0.2, which falls within the range specified in the present invention, as shown in the Executed Example 10a, has contained 2.0 wt % of a dimer acid, which is a reaction product of oleic acid and linoleic acid, and 10.0 wt % of rosin and has a ratio of the dimer acid to the rosin of 0.2, which falls within the range specified in the present invention, with the remainder being the solvent, as shown in the Executed Example 10b. In the soldering flux of the Executed Example 10b as well, a sufficient effect of suppressing cracks in a residue after soldering was obtained.

The soldering flux obtained by diluting, with the solvent, a resin composition containing 23.1 wt % of a dimer acid, which is a reaction product of oleic acid and linoleic acid, and 76.9 wt % of rosin and having a ratio of the dimer acid to the rosin of 0.3, which falls within the range specified in the present invention, as shown in the Executed Example 11a, has contained 3.0 wt % of a dimer acid, which is a reaction product of oleic acid and linoleic acid, and 10.0 wt % of rosin and has a ratio of the dimer acid to the rosin of 0.3, which falls within the range specified in the present invention, with the remainder being the solvent, as shown in the Executed Example 11b. In the soldering flux of the Executed Example 11b as well, a sufficient effect of suppressing cracks in a residue after soldering was obtained.

The soldering flux obtained by diluting, with the solvent, a resin composition containing 41.2 wt % of a dimer acid, which is a reaction product of oleic acid and linoleic acid, and 58.8 wt % of rosin and having a ratio of the dimer acid to the rosin of 0.7, which falls within the range specified in the present invention, as shown in the Executed Example 12a, has contained 7.0 wt % of a dimer acid, which is a reaction product of oleic acid and linoleic acid, and 10.0 wt % of rosin and has a ratio of the dimer acid to the rosin of 0.7, which falls within the range specified in the present invention, with the remainder being the solvent, as shown in the Executed Example 12b. In the soldering flux of Example 12b as well, a sufficient effect of suppressing cracks in a residue after soldering was obtained.

The soldering flux obtained by diluting, with the solvent, a resin composition containing 50.0 wt % of a dimer acid, which is a reaction product of oleic acid and linoleic acid, and 50.0 wt % of rosin and having a ratio of the dimer acid to the rosin of 1.0, which falls within the range specified in the present invention, as shown in the executed Example 13a, has contained 10.0 wt % of a dimer acid, which is a reaction product of oleic acid and linoleic acid, and 10.0 wt % of rosin and has a ratio of the dimer acid to the rosin of 1.0, which falls within the range specified in the present invention, with the remainder being the solvent, as shown in the Executed Example 13b. In the soldering flux of the Executed Example 13b as well, a sufficient effect of suppressing cracks in a residue after soldering was obtained.

The soldering flux obtained by diluting, with the solvent, a resin composition containing 14.7 wt % of a dimer acid which is a reaction product of oleic acid and linoleic acid, 14.7 wt % of a hydrogenated trimer acid obtained by adding hydrogen to a trimer acid which is a reaction product of oleic acid and linoleic acid, and 58.8 wt % of rosin and having a ratio of the total amount of the dimer acid and the hydrogenated trimer acid to the rosin of 0.5, which falls within the range specified in the present invention, and further containing malonic acid, succinic acid, glutaric acid, and adipic acid as organic acids, as shown in the Executed Example 14a, has contained 2.5 wt % of a dimer acid which is a reaction product of oleic acid and linoleic acid, 2.5 wt % of a hydrogenated trimer acid obtained by adding hydrogen to a trimer acid which is a reaction product of oleic acid and linoleic acid, and 10.0 wt % of rosin and has a ratio of the total amount of the dimer acid and the hydrogenated trimer acid to the rosin of 0.5, which falls within the range specified in the present invention, and further, has contained malonic acid, succinic acid, glutaric acid, and adipic acid as organic acids in an amount which falls within the range specified in the present invention, with the remainder being the solvent, as shown in the Executed Example 14b. In the soldering flux of the Executed Example 14b as well, a sufficient effect of suppressing cracks in a residue after soldering was obtained.

The soldering flux obtained by diluting, with the solvent, a resin composition containing 29.4 wt % of a dimer acid, which is a reaction product of oleic acid and linoleic acid, and 58.8 wt % of rosin and having a ratio of the dimer acid to the rosin of 0.5, which falls within the range specified in the present invention, and further containing glutaric acid as an organic acid and 2-phenylimidazole as an amine, as shown in the Executed Example 15a, has contained 5.0 wt % of a dimer acid, which is a reaction product of oleic acid and linoleic acid, and 10.0 wt % of rosin and has a ratio of the dimer acid to the rosin of 0.5, which falls within the range specified in the present invention, and further has contained glutaric acid as an organic acid in an amount which falls within the range specified in the present invention, and 2-phenylimidazole as an amine in an amount which falls within the range specified in the present invention, with the remainder being the solvent, as shown in the Executed Example 15b. In the soldering flux of the Executed Example 15b as well, a sufficient effect of suppressing cracks in a residue after soldering was obtained.

The soldering flux obtained by diluting, with the solvent, a resin composition containing 29.4 wt % of a dimer acid, which is a reaction product of oleic acid and linoleic acid, and 58.8 wt % of rosin and having a ratio of the dimer acid to the rosin of 0.5, which falls within the range specified in the present invention, and further containing glutaric acid as an organic acid and monoethanolamine as an amine, as shown in the Executed Example 16a, has contained 5.0 wt % of a dimer acid, which is a reaction product of oleic acid and linoleic acid, and 10.0 wt % of rosin and has a ratio of the dimer acid to the rosin of 0.5, which falls within the range specified in the present invention, and further, has contained glutaric acid as an organic acid in an amount which falls within the range specified in the present invention, and monoethanolamine as an amine in an amount which falls within the range specified in the present invention, with the remainder being the solvent, as shown in the Executed Example 16b. In the soldering flux of the Executed Example 16b, a sufficient effect of suppressing cracks in a residue after soldering was obtained.

The soldering flux obtained by diluting, with the solvent, a resin composition containing 29.4 wt % of a dimer acid, which is a reaction product of oleic acid and linoleic acid, and 58.8 wt % of rosin and having a ratio of the dimer acid to the rosin of 0.5, which falls within the range specified in the present invention, and further containing glutaric acid as an organic acid and amine hydrohalide as a halogen, as shown in the Executed Example 17a, has contained 5.0 wt % of a dimer acid, which is a reaction product of oleic acid and linoleic acid, and 10.0 wt % of rosin and has a ratio of the dimer acid to the rosin of 0.5, which falls within the range specified in the present invention, and further, has contained glutaric acid as an organic acid in an amount which falls within the range specified in the present invention, and amine hydrohalide as a halogen in an amount which falls within the range specified in the present invention, with the remainder being the solvent, as shown in the Executed Example 17b. In the soldering flux of the Executed Example 17b as well, a sufficient effect of suppressing cracks in a residue after soldering was obtained.

The soldering flux obtained by diluting, with the solvent, a resin composition containing 29.4 wt % of a dimer acid, which is a reaction product of oleic acid and linoleic acid, and 58.8 wt % of rosin and having a ratio of the dimer acid to the rosin of 0.5, which falls within the range specified in the present invention, and further containing glutaric acid as an organic acid and an organohalogen compound as a halogen, as shown in the Executed Example 18a, has contained 5.0 wt % of a dimer acid, which is a reaction product of oleic acid and linoleic acid, and 10.0 wt % of rosin and has a ratio of the dimer acid to the rosin of 0.5, which falls within the range specified in the present invention, and further, has contained glutaric acid as an organic acid in an amount which falls within the range specified in the present invention, and organohalogen compound as a halogen in an amount which falls within the range specified in the present invention, with the remainder being the solvent, as shown in the executed Example 18b. In the soldering flux of the Executed Example 18b as well, a sufficient effect of suppressing cracks in a residue after soldering was obtained.

The soldering flux obtained by diluting, with the solvent, a resin composition containing 29.1 wt % of a dimer acid, which is a reaction product of oleic acid and linoleic acid, and 58.1 wt % of rosin and having a ratio of the dimer acid to the rosin of 0.5, which falls within the range specified in the present invention, and further containing glutaric acid as an organic acid, 2-phenylimidazole as an amine, and amine hydrohalide as a halogen, as shown in the Executed Example 19a, has contained 5.0 wt % of a dimer acid, which is a reaction product of oleic acid and linoleic acid, and 10.0 wt % of rosin and has a ratio of the dimer acid to the rosin of 0.5, which falls within the range specified in the present invention, and further, has contained glutaric acid as an organic acid in an amount which falls within the range specified in the present invention, 2-phenylimidazole as an amine in an amount which falls within the range specified in the present invention, and amine hydrohalide as a halogen in an amount which falls within the range specified in the present invention, with the remainder being the solvent, as shown in the Executed Example 19b. In the soldering flux of the Executed Example 19b as well, a sufficient effect of suppressing cracks in a residue after soldering was obtained.

The soldering flux obtained by diluting, with the solvent, a resin composition containing 27.8 wt % of a dimer acid, which is a reaction product of oleic acid and linoleic acid, and 55.6 wt % of rosin and having a ratio of the dimer acid to the rosin of 0.5, which falls within the range specified in the present invention, and further containing glutaric acid as an organic acid, 2-phenylimidazole as an amine, and an organohalogen compound as a halogen, as shown in the Executed Example 20a, has contained 5.0 wt % of a dimer acid, which is a reaction product of oleic acid and linoleic acid, and 10.0 wt % of rosin and has a ratio of the dimer acid to the rosin of 0.5, which falls within the range specified in the present invention, and further, has contained glutaric acid as an organic acid in an amount which falls within the range specified in the present invention, 2-phenylimidazole as an amine in an amount which falls within the range specified in the present invention, and an organohalogen compound as a halogen in an amount which falls within the range specified in the present invention, with the remainder being the solvent, as shown in the Executed Example 20b. In the soldering flux of the Executed Example 20b as well, a sufficient effect of suppressing cracks in a residue after soldering was obtained.

In each of the Executed Examples, isopropyl alcohol was used as a solvent, but the same effect was obtained when industrial ethanol (a mixed solvent obtained by adding methanol and/or isopropyl alcohol to ethanol) was used.

On the other hand, the soldering flux obtained by diluting, with the solvent, a resin composition containing none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, containing malonic acid as an organic acid, and further containing rosin, as shown in the Comparative Example 1a, has contained none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, has contained malonic acid as an organic acid in an amount which falls within the range specified in the present invention, and further, has contained rosin in an amount which falls within the range specified in the present invention, with the remainder being the solvent, as shown in the Comparative Example 1b. In the soldering flux of the Comparative Example 1b, cracks were observed in a residue after soldering, and no sufficient effect of suppressing cracks in a residue was obtained.

The soldering flux obtained by diluting, with the solvent, a resin composition containing none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, containing succinic acid as an organic acid, and further containing rosin, as shown in the Comparative Example 2a, has contained none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, has contained succinic acid as an organic acid in an amount which falls within the range specified in the present invention, and further, has contained rosin in an amount which falls within the range specified in the present invention, with the remainder being the solvent, as shown in the Comparative Example 2b. In the soldering flux of the Comparative Example 2b as well, cracks were observed in a residue after soldering, and no sufficient effect of suppressing cracks in a residue was obtained.

The soldering flux obtained by diluting, with the solvent, a resin composition containing none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, containing glutaric acid as an organic acid, and further containing rosin, as shown in the Comparative Example 3a, has contained none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, has contained glutaric acid as an organic acid in an amount which falls within the range specified in the present invention, and further, has contained rosin in an amount which falls within the range specified in the present invention, with the remainder being the solvent, as shown in the Comparative Example 3b. In the soldering flux of the Comparative Example 3b as well, cracks were observed in a residue after soldering, and no sufficient effect of suppressing cracks in a residue was obtained.

The soldering flux obtained by diluting, with the solvent, a resin composition containing none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, containing adipic acid as an organic acid, and further containing rosin, as shown in the Comparative Example 4a, has contained none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, has contained adipic acid as an organic acid in an amount which falls within the range specified in the present invention, and further, has contained rosin in an amount which falls within the range specified in the present invention, with the remainder being the solvent, as shown in the Comparative Example 4b. In the soldering flux of the Comparative Example 4b as well, cracks were observed in a residue after soldering, and no sufficient effect of suppressing cracks in a residue was obtained.

The soldering flux obtained by diluting, with the solvent, a resin composition containing none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, containing no different organic acid, and containing rosin alone, as shown in the Comparative Example 5a, has contained none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, has contained no different organic acid, and has contained rosin alone, as shown in the Comparative Example 5b. In the soldering flux of the Comparative Example 5b as well, cracks were observed in a residue after soldering, and no sufficient effect of suppressing cracks in a residue was obtained.

Even when containing a dimer acid, which is a reaction product of oleic acid and linoleic acid, the soldering flux obtained by diluting, with the solvent, a resin composition containing 1.0 wt % of a dimer acid, which is a reaction product of oleic acid and linoleic acid, and 99.0 wt % of rosin and having a ratio of the dimer acid to the rosin of 0.01, which falls below the range specified in the present invention, as shown in the Comparative Example 6a, has contained 0.1 wt % of a dimer acid, which is a reaction product of oleic acid and linoleic acid and 10.0 wt % of rosin, with the remainder being the solvent, and has a dimer acid amount below the range specified in the present invention and a ratio of the dimer acid to the rosin of 0.01, which falls below the range specified in the present invention, as shown in the Comparative Example 6b. In the soldering flux of the Comparative Example 6b, cracks were observed in a residue after soldering, and no sufficient effect of suppressing cracks in a residue was obtained.

Even when containing a dimer acid, which is a reaction product of oleic acid and linoleic acid, the soldering flux obtained by diluting, with the solvent, a resin composition containing 4.8 wt % of a dimer acid, which is a reaction product of oleic acid and linoleic acid, and 95.2 wt % of rosin and having a ratio of the dimer acid to the rosin of 0.05, which falls below the range specified in the present invention, as shown in the Comparative Example 7a, has contained 0.5 wt % of a dimer acid, which is a reaction product of oleic acid and linoleic acid and 10.0 wt % of rosin, with the remainder being the solvent, and has a dimer acid amount below the range specified in the present invention and a ratio of the dimer acid to the rosin of 0.05, which falls below the range specified in the present invention, as shown in the Comparative Example 7b. In the soldering flux of the Comparative Example 7b, cracks were observed in a residue after soldering, and no sufficient effect of suppressing cracks in a residue was obtained.

Even when containing a dimer acid, which is a reaction product of oleic acid and linoleic acid, the soldering flux obtained by diluting, with the solvent, a resin composition containing 9.1 wt % of a dimer acid, which is a reaction product of oleic acid and linoleic acid, and 90.9 wt % of rosin and having a ratio of the dimer acid to the rosin of 0.1, which falls below the range specified in the present invention, as shown in the Comparative Example 8a, has contained 1.0 wt % of a dimer acid, which is a reaction product of oleic acid and linoleic acid and 10.0 wt % of rosin, with the remainder being the solvent, and has a dimer acid amount below the range specified in the present invention and a ratio of the dimer acid to the rosin of 0.1, which falls below the range specified in the present invention, as shown in the Comparative Example 8b. In the soldering flux of the Comparative Example 8b, cracks were observed in a residue after soldering, and no sufficient effect of suppressing cracks in a residue was obtained.

The soldering flux obtained by diluting, with the solvent, a resin composition containing none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, containing glutaric acid as an organic acid, and further containing rosin, as shown in each of the Comparative Examples 9a to 12a, has contained none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, has contained glutaric acid as an organic acid, and further, has contained rosin, as shown in each of the Comparative Examples 9b to 12b. In the soldering fluxes of the Comparative Example 9b to Comparative Example 12b, even though the amount of the organic acid was changed within the range specified in the present invention, cracks were observed in a residue after soldering, and no sufficient effect of suppressing cracks in a residue was obtained.

The soldering flux obtained by diluting, with the solvent, a resin composition containing none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, containing glutaric acid as an organic acid, and further containing rosin, as shown in the Comparative Example 13a, has contained none of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, has contained glutaric acid as an organic acid which falls beyond the scope specified in the present invention, and further, has contained rosin, as shown in the Comparative Example 13b. In the soldering flux of the Comparative Example 13b, cracks were observed in a residue after soldering, and no sufficient effect of suppressing cracks in a residue was obtained.

In view of the above, in the soldering flux containing any one of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, or two species or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, rosin, and a solvent, wherein a ratio between an amount of any one of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, or a total amount of the two species or more of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, and an amount of rosin is 0.15 or more and 1.00 or less based on that of the rosin, cracks in a residue after soldering was suppressed.

The above effect was obtained by a soldering flux obtained by diluting, with a solvent, a resin composition containing any one of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid; or two species or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, and rosin, wherein a ratio between an amount of any one of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, or a total amount of the two species or more of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, and an amount of rosin is 0.15 or more and 1.00 or less based on that of the rosin.

Thus, it has been found that the effect of the present invention is due to the ratio between the amount of any one of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, or a total amount of the two species or more of the dimer acid which is the reaction product of the oleic acid and the linoleic acid, the trimer acid which is the reaction product of the oleic acid and the linoleic acid, the hydrogenated dimer acid obtained by adding the hydrogen to the dimer acid which is the reaction product of the oleic acid and the linoleic acid, and the hydrogenated trimer acid obtained by adding the hydrogen to the trimer acid which is the reaction product of the oleic acid and the linoleic acid, and an amount of rosin.

The invention claimed is:

1. A soldering flux consisting of:
    at least one acid selected from a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid;
    5.0 wt % or more and 10.0 wt % or less of rosin;
    80.0 wt % or more and 90.0 wt % or less of a solvent; and
    optionally, an activator composed of one or more of:
        0 wt % or more and 5.0 wt % or less of an organic acid which is neither a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, nor a hydrogenated trimer acid obtained by adding hydrogen to a trimer acid which is a reaction product of oleic acid and linoleic acid;
        0 wt % or more and 1.0 wt % or less of an organohalogen compound;
        0 wt % or more and 1.0 wt % or less of an amine hydrohalide; and
        0 wt % or more and 1.0 wt % or less of amine,
    wherein a weight ratio of the at least one acid to the rosin is 0.15 or more and 1.00 or less based on the weight of the rosin,
    wherein, if the at least one acid comprises two or more acids selected from the dimer acid, the trimer acid, the hydrogenated dimer acid, and the hydrogenated trimer acid, a weight ratio of the two or more acids to the rosin is 0.15 or more and 1.00 or less based on the weight of the rosin, and wherein the solvent is selected from the group consisting of: ethanol, isopropyl alcohol, and a mixed solvent obtained by adding methanol and/or isopropyl alcohol to ethanol.

2. The soldering flux according to claim 1, comprising:
a total amount of 1.5 wt % or more and 10.0 wt % or less of the at least one acid.

* * * * *